Patented June 9, 1942

2,285,473

UNITED STATES PATENT OFFICE 2,285,473

HYDROHALOGENATION PROCESS

Charles A. Thomas and Herbert E. Morris, Dayton, Ohio, assignors to Monsanto Chemical Company, St. Louis, Mo., a corporation of Delaware No Drawing. Application May 17, 1938, Serial No. 208,486

10 Claims. (Cl. 260—626)

The present invention relates to a process of combining or adding hydrogen halides to unsaturated organic compounds and comprises the process of hydrohalogenating organic compounds such as olefins by the use of complex addition compounds of hydrogen halides and 1,4-dioxane (also designated as p-dioxane or tetrahydro-p-dioxin or simply as dioxane).

The object of the invention is to provide an improved method of hydrohalogenating unsaturated organic compounds. Other objects of the invention will be apparent from the description which follows hereinafter.

Many processes of hydrohalogenating unsaturated organic compounds are known in the art. The process of the present invention is novel and by its use the reaction between the unsaturated organic compound and the hydrogen halide is facilitated, the reaction period is shortened, and certain hydrohalogenation reactions can be controlled to proceed with a diminished formation of undesirable isomeric compounds.

The advantageous results of the present invention depend from the discovery that dioxane forms addition complexes with hydrogen halides of the formula $C_4H_8O_2 \cdot HX$, in which X represents halogen. However, in using this complex, greater than the mol for mol ratios indicated by the formula may be and preferably are used. The complex forms in the presence of water and hence aqueous solutions of hydrogen halides may be used for its preparation. The formation of a complex addition product is established by the following observations. When hydrogen chloride is passed into dioxane considerable evolution of heat occurs. Similarly there is considerable evolution of heat when dioxane is added to concentrated hydrochloric acid. Approximately 41.7 grams of hydrogen chloride are retained by 100 grams of dioxane and the resulting compound forms crystals at about —40° C. The crystals on rewarming do not lose any appreciable weight. The compound is an addition compound, therefore, and not a mere solution of hydrogen chloride in dioxane.

In the methods heretofore used for the hydrohalogenation of unsaturated organic compounds, the unsaturated compounds are subjected to the action of gaseous hydrogen halide or to solutions of the hydrogen halide in various solvents which are either miscible or immiscible with the unsaturated compound, for example, an aqueous solution of hydrogen chloride (commercial hydrochloric acid) is a convenient method of adding hydrogen chloride to amylene to form tertiary-amyl chloride. In the practice of the present invention the hydrogen halide is added to the unsaturated organic compound in the form of a complex addition product with dioxane. This complex addition product may be formed by passing the hydrogen halide into dioxane and the resulting liquid added in one addition or in small portions to the compound to be hydrohalogenated. Alternatively, the complex can be formed by adding an aqueous solution of the hydrogen halide, for example, commercial concentrated hydrochloric acid, to dioxane. The complex addition product can also be formed in situ, that is, the dioxane may be added to the substance to be hydrohalogenated and thereafter hydrogen halide added to the resulting solution or mixture. For certain types of reaction one of these alternatives is more advantageous than another, as is obvious.

The process of the invention is applicable to the hydrohalogenation of a wide variety of unsaturated organic compounds but is particularly useful for the addition of hydrogen chloride to olefins and diolefins such as ethylene, propylene, butylene, isobutylene, pentenes, isoprene, butadiene, unsaturated alcohols, unsaturated ethers, unsaturated acids such as maleic acid, and the like. The compounds may be in solution in a solvent or may be reacted without being in a dissolved form.

The hydrohalogenation process can be conducted under atmospheric or increased pressure and in many cases it is advantageous to promote the reaction by heating. The process can be conducted either as a batch or a continuous operation in known manners. Catalysts such as iron, ferric chloride, aluminum chloride and similar metals and metallic salts may be used to facilitate the addition.

The invention also provides a method of forming isopropyl alcohol and isopropyl ether by reaction of propylene and the addition product of hydrogen chloride and dioxane and subsequent hydrolysis of the resulting mixture. Isopropyl-phenyl ether and isopropylated phenols are produced by reaction of phenol, propylene and the addition compound of dioxane and hydrogen chloride.

Examples of preferred methods of practicing the invention follow:

*Example 1.*—Into 176 grams of dioxane was passed anhydrous hydrogen chloride gas until a weight increase of 57 grams had been obtained. This complex addition product was then placed in an iron bomb together with 42 grams of liquid propylene and the mixture was heated at 85° to 100° C. for 2 hours under the pressure generated within the bomb, which was about 200 to 250 pounds per square inch. There was a small proportion of ferric chloride formed in the bomb, which acted catalytically. From the reaction product a substantially quantitative yield of isopropyl chloride was recovered.

Propylene is substantially unabsorbed and unreacted when passed through the dioxane-hydrogen-chloride complex at atmospheric pressure. There is considerable absorption and reaction when a small proportion of ferric chloride is added to the complex but the absorption at atmospheric pressure is not quantitative. For quantitative conversions the preferred method of heating under pressure is recommended.

*Example 2.*—The foregoing example was repeated in the absence of a catalyst. Anhydrous hydrogen chloride gas was passed into 35 grams of a dioxane until 10 grams had been absorbed. The complex was placed in a glass bomb tube with 6 grams of liquid propylene, the tube was sealed and thereafter was heated at 100° C. for 2 hours. The unreacted propylene corresponded to 4.2 grams, indicating that isopropyl chloride is formed but that in the absence of a catalyst the yield does not correspond to the theoretical.

*Example 3.*—Two hundred ninety (290) grams of a dioxane-hydrogen-chloride complex containing 53 grams of hydrogen chloride were placed in an iron bomb with 80 grams of propylene. The bomb was heated at 85° to 110° C. for 1 hour. Ferric chloride was present from the bomb. The hydrogen chloride present in the complex was quantitatively converted to isopropyl chloride. The propylene used in this experiment was in excess of the quantity of propylene which combines theoretically with the hydrogen chloride. The recovered materials were excess propylene and isopropyl chloride together with the original dioxane present in the complex. The example indicates that all the hydrogen chloride present in the complex is recoverable in a hydrohalogenation reaction under suitable conditions.

*Example 4.*—Two hundred (200) grams of commercial hydrochloric acid (sp. gr. 1.18 to 1.20), 100 grams of dioxane, 5 grams of ferric chloride (anhydrous weight) and about 110 grams of liquid propylene were placed together in an enamel-lined bomb and heated for 3 hours at 85° to 100° C. The reaction product separated on cooling into two layers with the isopropyl chloride concentrated in the top layer. The bottom layer still contained free hydrochloric acid uncombined with the excess propylene. From the top layer about 85 grams of isopropyl chloride were removed by distillation.

*Example 5.*—Two hundred (200) grams of concentrated hydrochloric acid (sp. gr. 1.18 to 1.20), 90 grams of dioxane, 2 grams of ferric oxide ($Fe_2O_3$) and about 75 grams of liquid propylene were placed in a lead-lined bomb and heated for 3 hours at 85° to 100° C. The excess propylene was blown off and the liquid products were present in two layers. The products recovered comprised 37 grams of isopropyl chloride, 15 grams of isopropyl alcohol and a trace of isopropyl ether. In the presence of lead, hydrolysis of isopropyl chloride to isopropyl alcohol occurs.

*Example 6.*—Two mols (188 grams) of phenol were dissolved in 100 grams of dioxane and dry hydrogen chloride was passed into the solution until 18.5 grams had been absorbed. The mixture together with 110 grams of propylene was charged into an iron bomb and the bomb was heated for 1 hour at 85° to 100° C. The excess propylene was vented and the liquid products were recovered. No free hydrogen chloride was present and the products comprised the dioxane, unreacted phenol, isopropyl chloride and a mixture of isopropyl phenyl ether and ispropylated phenols.

Reference is made to my co-pending application, Serial No. 365,770, filed November 15, 1940, in which is claimed subject matter originally disclosed but not claimed herein.

Although the foregoing examples constitute preferred embodiments of the invention it is to be understood that the invention is not limited thereto. The specification is restricted largely to hydrochlorination processes but it is obvious that it is applicable to the addition of other hydrogen halides such as hydrogen bromide and hydrogen iodide. Other modifications and variations, which are necessary for adapting the process of the invention to related uses, are contemplated. The scope of the invention is therefore limited solely by the appended claims.

We claim:

1. The process of facilitating reactions involving the addition of a hydrogen halide to a monomeric unsaturated organic compound whose only unsaturation is olefinic, which consists in subjecting the reaction mixture containing the unsaturated compound to the action of a hydrogen halide in the form of a complex addition product of dioxane and the hydrogen halide.

2. In the process of combining a hydrogen halide with a monomeric unsaturated organic compound whose only unsaturation is olefinic, the improvement which comprises subjecting the unsaturated compound to the action of a hydrogen halide in the form of a complex addition product of dioxane and the hydrogen halide.

3. The process of facilitating reactions involving the addition of hydrogen chloride to a monomeric olefin which consists in subjecting the reaction mixture containing the olefin to the action of hydrogen chloride in the form of a complex addition product of dioxane and hydrogen chloride.

4. In the process of combining hydrogen chloride with a monomeric olefin, the improvement which comprises subjecting the olefin to the action of a complex addition product of hydrogen chloride and dioxane.

5. The process of producing an alkyl chloride which comprises treating a mono-olefin with a complex addition product of hydrogen chloride and dioxane.

6. The process of producing isopropyl chloride which comprises treating propylene with a complex addition product of hydrogen chloride and dioxane.

7. The process of producing isopropyl chloride which comprises forming a complex addition compound by passing hydrogen chloride into dioxane until not substantially more than one molecular equivalent of hydrogen chloride to one molecular equivalent of dioxane has been absorbed and thereafter heating propylene with said addition compound under pressure at a temperature of approximately 85° to 110° C.

8. The method of producing an alkylphenol which comprises reacting a mixture of an olefin and a phenol together with the complex addition compound of dioxane and hydrogen chloride.

9. The process of producing an isopropylated phenol which comprises reacting a mixture of propylene and phenol together with the complex addition compound of dioxane and hydrogen chloride.

10. The process of producing an isopropylated phenol which comprises dissolving phenol in dioxane and thereafter passing hydrogen chloride into the solution until not substantially more than one molecular equivalent of hydrogen chloride to one molecular equivalent of dioxane has been absorbed, and subsequently heating propylene with said solution under pressure at a temperature of approximately 85° to 100° C. and recovering the isopropylated phenol from the reaction mixture.

CHARLES A. THOMAS.
HERBERT E. MORRIS.